(No Model.)
O. CARPENTER.
ELASTIC TOY.
No. 494,410. Patented Mar. 28, 1893.
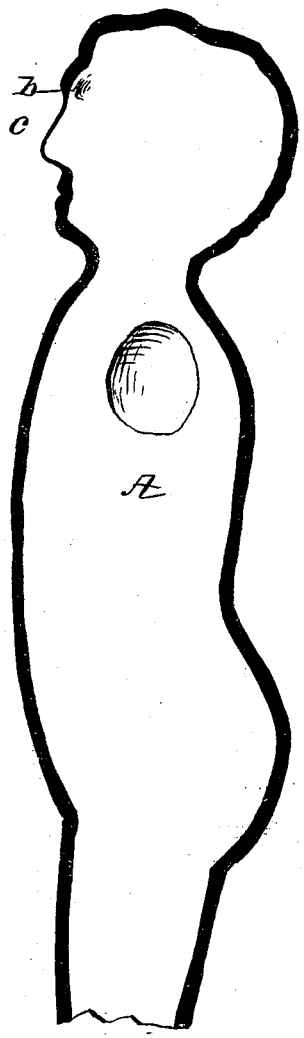
Fig: 1.
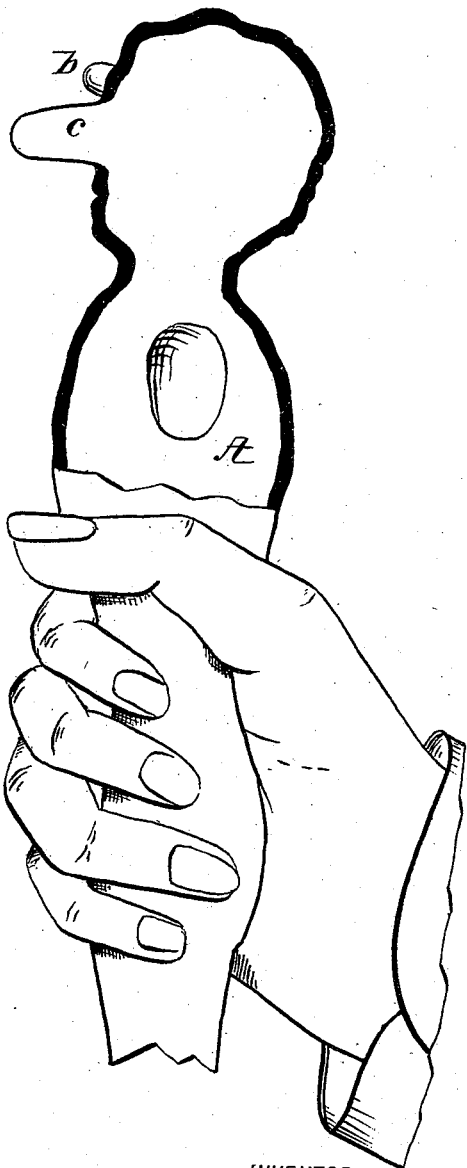
Fig: 2.
WITNESSES:
Chas. Nida.
C. Sedgwick
INVENTOR
O. Carpenter
BY Munn & Co
ATTORNEYS.

UNITED STATES PATENT OFFICE.

ORVILLE CARPENTER, OF PAWTUCKET, RHODE ISLAND.

ELASTIC TOY.

SPECIFICATION forming part of Letters Patent No. 494,410, dated March 28, 1893.

Application filed December 22, 1892. Serial No. 456,051. (No model.)

*To all whom it may concern:*

Be it known that I, ORVILLE CARPENTER, of Pawtucket, in the county of Providence and State of Rhode Island, have invented a new and useful Improvement in Elastic Toys or Images, of which the following is a full, clear, and exact description.

This invention relates to hollow toys or images made of india-rubber or its compounds. Hollow elastic or rubber images of human beings and various animals or objects, mainly as toys, have long been in use, and these when squeezed or compressed by hand have been made to alter their shape generally. Such rubber toys or images however have been very restricted in their change of form, as least so far as any special part or feature of them, by reason of the uniform elasticity of the parts immediately connected, and by reason of the uniform or general distribution of the compressed air within the image exerting no special action or distention of one part of the image over or as compared with adjacent parts which are of the same elasticity or made of the same thickness of rubber as the part or parts more especially designed to be changed in shape or size.

My invention essentially differs from this, and consists in a construction of the rubber toy or image with a certain part or parts, which are required to be made more prominent or changed in shape, relatively to adjacent parts on squeezing or compressing the image by hand or otherwise, of greater elasticity than the adjacent parts, and which is preferably done by making the part or parts to be changed in form or prominence of a diminished thickness of rubber as compared with adjacent parts, so that the compression of the air within the image produced by squeezing the latter, that should have no or but little vent, will act with special or increased effect to distend or change in shape the part or parts of increased elasticity, thereby giving a distortion to the special parts or features to produce a more comical or grotesque or changed appearance to the image.

Reference is to be had to the accompanying drawings forming a part of this specification, in which similar letters of reference indicate corresponding parts in both the figures.

Figure 1 represents a vertical section or diagram of an image of a human figure, in part, constructed in accordance with my invention and showing the same before certain parts or features of it are changed in form by squeezing the image and compressing the air within it; and Fig. 2 is a similar view after the said certain parts or features are changed in form by squeezing the image.

In the illustration selected to explain my invention and which will answer as well as any other for that purpose, an image or figure A, is shown made of rubber or like elastic material, with the eyes $b$ and nose $c$ made thinner or more elastic than the rest of the image or parts adjacent thereto, so that upon squeezing, by hand for instance, the hollow rubber image as shown in Fig. 2, the air compressed within the closed or mainly closed image, will act in a direct manner upon the more sensitive or elastic parts $b$ $c$, to swell or bulge and contort or enlarge the eyes and nose from or as compared with their normal form shown in Fig. 1.

If desired, the whole head of the image may be made of thinner or more elastic material than its body, so as to produce a still different or more grotesque appearance by squeezing the body. The invention in fact is not restricted to any particular image, or part or parts of the image to be contorted or changed in form by constructing such parts of thinner or more elastic material than adjacent parts.

As a toy for children the invention will be found to be very amusing and attractive, especially if the toy is designed by a good artist and its parts or features are suitably painted.

Having thus described my invention, what I claim as new, and desire to secure by Letters Patent, is—

1. In closed or approximately closed hollow toys or images made of rubber or like elastic material, the construction of the toy or image with one or more parts of it of greater elasticity than the adjacent parts, whereby on squeezing the toy or image where it is of lesser elasticity, the air compressed in the toy or image will be caused to specially enlarge, control or change in form the part or parts of greater elasticity, substantially as specified.

2. In closed or approximately closed hollow toys or images made of rubber or like elastic material, the construction of the toy or image of varying thickness or the rubber or elastic material in adjacent parts, essentially as and for the purpose herein described.

ORVILLE CARPENTER.

Witnesses:
BENJAMIN L. CARPENTER,
HENRY T. CARPENTER.